US012326929B2

(12) United States Patent
Shipley et al.

(10) Patent No.: US 12,326,929 B2
(45) Date of Patent: Jun. 10, 2025

(54) SYSTEM AND METHOD FOR PROVIDING USER FEEDBACK

(71) Applicant: Beauceron Security Inc., Fredericton (CA)

(72) Inventors: David Shipley, Rusagonis (CA); Sean Mcdougall, Beaver Dam (CA)

( * ) Notice: Subject to any disclaimer, the term of this patent is extended or adjusted under 35 U.S.C. 154(b) by 326 days.

(21) Appl. No.: 17/977,629

(22) Filed: Oct. 31, 2022

(65) Prior Publication Data

US 2024/0143742 A1 May 2, 2024

(51) Int. Cl.
*G06F 21/55* (2013.01)

(52) U.S. Cl.
CPC ...... *G06F 21/552* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 9,325,730 | B2* | 4/2016 | Higbee | H04L 63/1466 |
| 9,774,626 | B1* | 9/2017 | Himler | H04L 63/1483 |
| 9,781,149 | B1* | 10/2017 | Himler | H04L 63/1425 |
| 10,027,701 | B1* | 7/2018 | Himler | H04L 69/22 |
| 10,158,677 | B1* | 12/2018 | DiCorpo | H04L 63/145 |
| 10,581,898 | B1* | 3/2020 | Singh | H04L 63/1416 |
| 10,757,058 | B2* | 8/2020 | Baracaldo Angel | H04L 63/1416 |
| 2005/0015626 | A1 | 1/2005 | Chasin | |
| 2005/0273856 | A1* | 12/2005 | Huddleston | G06F 21/566 726/22 |
| 2012/0078747 | A1* | 3/2012 | Chakrabarti | G06Q 30/0631 705/26.7 |
| 2014/0082726 | A1* | 3/2014 | Dreller | H04L 51/48 726/23 |
| 2016/0301705 | A1* | 10/2016 | Higbee | H04L 51/42 |
| 2017/0244736 | A1* | 8/2017 | Benishti | H04L 63/1441 |
| 2018/0191754 | A1* | 7/2018 | Higbee | H04L 63/1416 |
| 2019/0132273 | A1* | 5/2019 | Ryan | H04L 63/1483 |
| 2019/0205888 | A1 | 7/2019 | Nandy | |
| 2019/0349400 | A1* | 11/2019 | Bruss | G06F 21/53 |
| 2020/0067861 | A1* | 2/2020 | Leddy | G06F 21/6245 |

(Continued)

OTHER PUBLICATIONS

Microsoft, "Use the Report Message add-in", retrieved from wayback machine on Jul. 11, 2020, Microsoft,, 6 Pages (Year: 2020).*

*Primary Examiner* — Christopher C Harris
(74) *Attorney, Agent, or Firm* — Borden Ladner Gervais LLP; Curtis B. Behmann

(57) ABSTRACT

The disclosure provides computing platforms, systems, methods, and storage media for delivering contextual feedback to a user of a potential cybersecurity attack, such as a phishing attack. In an aspect, the disclosure provides: configuring, via a processor, a plurality of rules, each rule associated with an indicator of suspicious activity and a feedback snippet corresponding to the indicator; receiving, at the processor, a report of a potentially malicious electronic communication; triggering, at the processor, a rule of the plurality of rules based on the associated indicator and the report of the electronic communication; generating, at the processor, feedback comprising the feedback snippet associated with each triggered rule; automatically providing the feedback to the user.

18 Claims, 5 Drawing Sheets

(56) References Cited

U.S. PATENT DOCUMENTS

| | | | |
|---|---|---|---|
| 2020/0092257 A1 | 3/2020 | Goldstein | |
| 2020/0127953 A1 | 4/2020 | Maddipati | |
| 2020/0137081 A1 | 4/2020 | Goldstein | |
| 2020/0137110 A1* | 4/2020 | Tyler | H04L 63/1483 |
| 2020/0177614 A1 | 6/2020 | Burns et al. | |
| 2020/0195664 A1* | 6/2020 | Castilho | H04L 63/1416 |
| 2020/0204572 A1 | 6/2020 | Jeyakumar et al. | |
| 2020/0258044 A1 | 8/2020 | Lin et al. | |
| 2020/0279225 A1* | 9/2020 | Li | H04L 63/0245 |
| 2020/0358820 A1* | 11/2020 | Kolingivadi | H04L 63/1433 |
| 2021/0021612 A1* | 1/2021 | Higbee | H04L 63/1416 |
| 2021/0126944 A1* | 4/2021 | Lesperance | H04L 63/1433 |
| 2021/0258326 A1* | 8/2021 | Rotem | H04L 63/1425 |
| 2021/0344713 A1* | 11/2021 | Kras | H04L 51/212 |
| 2022/0030029 A1 | 1/2022 | Kagan et al. | |
| 2022/0286419 A1* | 9/2022 | Stetzer | H04L 51/212 |
| 2023/0086556 A1* | 3/2023 | Himler | H04L 63/1441 726/23 |

\* cited by examiner

Feedback Digest 400

Snippet 410

Thank you for reporting this e-mail. Below you will find a summary of the results of the automated analysis.

Please note, the absence of any feedback below does not mean the e-mail was safe, simply that it passed the tests the system had at the time.

Snippet 420

NO USER INTERACTION
When you reported this e-mail, you indicated that you had not interacted with it by clicking on any links, opening any attachments, replying to sender, or forwarding to others.

However, if you did interact with this e-mail and further feedback below indicates the e-mail is potentially malicious, please contact ITHELPDESK@COMPANY.COM to ensure you and COMPANY are protected.

Snippet 430

WARNING – SPOOFING DETECTED
Our automated analysis has confirmed that this e-mail used spoofing to pretend to be from COMPANY.COM e-mail address but it is actually coming from another domain.

FIG. 4

SYSTEM AND METHOD FOR PROVIDING USER FEEDBACK

FIELD

The present disclosure relates to systems and methods for reporting electronic communications; and, more particularly to providing feedback to users who report electronic communications; and, even more particularly to providing contextual feedback to users who report suspicious e-mails.

BACKGROUND

Cybersecurity attacks generally target digital infrastructure such as databases, computers, computer systems and networks, and so forth, for the purpose of extracting or gaining unauthorized access to private, sensitive, or otherwise confidential data and/or resources, typically for a malicious purpose. Phishing attacks are a common cybersecurity attack and one of the leading causes of cybersecurity and data breach incidents worldwide. Phishing attacks generally involve sending a communication to a target designed to deceive the target into taking an action that comprises a security measure, allowing the attacker to thereby gain unauthorized access to private, sensitive, or otherwise confidential data and/or resources. In response to the proliferation of cybersecurity attacks, such as phishing attacks, organizations have implemented simulations and training to improve user skills and reduce susceptibility to malicious cybersecurity incidents.

It remains desirable however to develop further improvements and advancements in relation to detecting and responding to cybersecurity attacks, to overcome shortcomings of known techniques, and to provide additional advantages thereto.

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

BRIEF DESCRIPTION OF THE DRAWINGS

Embodiments of the present disclosure will now be described, by way of example only, with reference to the attached Figures.

FIG. 4 illustrates a feedback digest comprising a plurality of feedback snippets, in accordance with an embodiment of the present disclosure.

Figure 1:
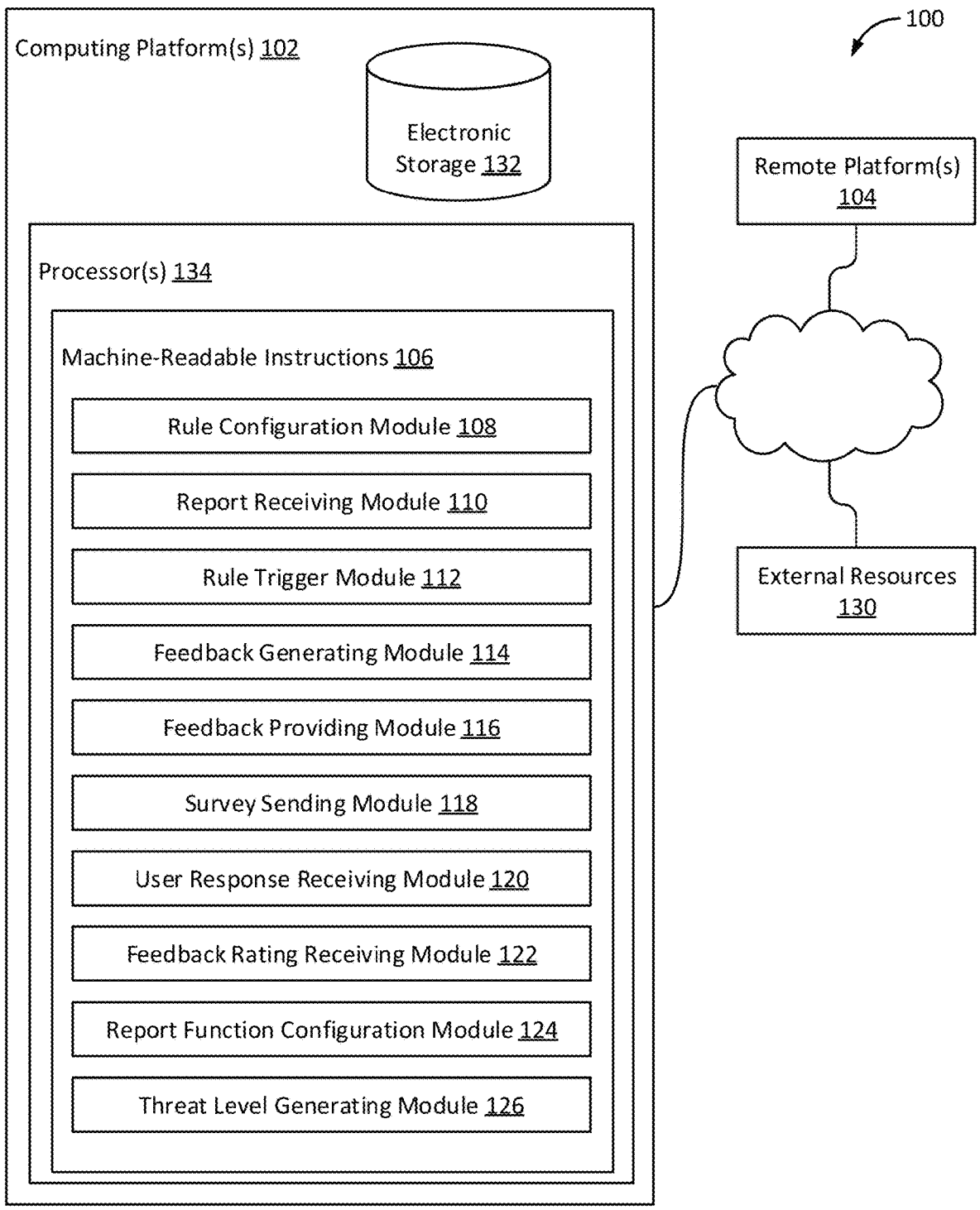
FIG. 1 illustrates a system configured for providing feedback to a user in response to the user reporting electronic communication, in accordance with an embodiment of the present disclosure.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompasses by the corresponding description.

DETAILED DESCRIPTION

The following are examples of systems and methods for providing user feedback in accordance with the present disclosure.

Example Embodiments of the disclosure can be described with reference to the following clauses, with specific features laid out in the dependent clauses:

An aspect of the present disclosure relates to a system configured for providing contextual feedback to a user of a suspected phishing attack. The system may include one or more hardware processors configured by machine-readable instructions. The processor(s) may be configured to configure, via a processor, a plurality of rules. Each rule may be associated with an indication of a suspicious activity and a feedback snippet corresponding to the indication of the suspicious activity. The processor(s) may be configured to receive, at the processor, a report of a suspicious electronic communication. The processor(s) may be configured to trigger, at the processor, a rule of the plurality of rules based on the associated indication of the suspicious activity and the report of the suspicious electronic communication. The processor(s) may be configured to generate, at the processor, feedback including the feedback snippet associated with each triggered rule. The processor(s) may be configured to automatically provide the contextual feedback to the user.

In some implementations of the system, the processor(s) may be configured to send, to the user, a survey for soliciting user feedback on the suspicious electronic message. In some implementations of the system, the processor(s) may be configured to receive, from the user, a user response to the survey. In some implementations of the system, triggering the plurality of rules may be further based on the user response to the survey.

In some implementations of the system, the survey may include a close ended question prompting the user to select a reason for reporting the suspicious electronic communication.

In some implementations of the system, the survey may include a close ended question prompting the user to identify whether they interacted with the suspicious electronic communication.

In some implementations of the system, the processor(s) may be configured to receive, from the user, a feedback rating selected by the user in response to the feedback provided to the user.

In some implementations of the system, the processor(s) may be configured to configure, at the processor, a report function for incorporation into an e-mail client. In some implementations of the system, the processor may receive the report of the suspicious electronic communication in response to the user engaging the report function.

In some implementations of the system, the report of the suspicious electronic message may include the suspicious electronic message.

In some implementations of the system, the processor(s) may be configured to generate an initial threat level based on assessing the suspicious electronic communication against common indicators of a malicious electronic communication.

In some implementations of the system, the processor(s) may be configured to configure each of the plurality of rules to include an associated threat level corresponding to the indication of the suspicious activity. In some implementations of the system, the processor(s) may be configured to generate a final threat level based on the initial threat level and the associated threat level for the each triggered rule. In some implementations of the system, the feedback may further include the final threat level.

In some implementations of the system, the feedback snippet may include text for educating the user on a risk associated with the indication of suspicious activity.

In some implementations of the system, the feedback snippet may include text and graphics for educating the user on a behaviour for avoiding a risk associated with the indication of the suspicious activity.

In some implementations of the system, the feedback may include ordering the feedback snippets in a digest.

In some implementations of the system, the plurality of rules may be configured in an ordered sequence.

In some implementations of the system, generating the feedback may further include presenting the feedback snippets in an order corresponding to the ordered sequence of the plurality of rules.

In some implementations of the system, the plurality of rules may be configured for triggering based on boolean logic.

In some implementations of the system, the plurality of rules may include a rule wherein the associated indication of the suspicious activity includes a user interaction with the suspicious electronic communication.

In some implementations of the system, the plurality of rules may include a rule wherein the associated indication of the suspicious activity includes a malicious link.

In some implementations of the system, the report of the suspicious electronic communication may do not trigger any of the plurality of rules and the feedback includes a snippet advising of a likely safe electronic communication.

In some implementations of the system, the electronic communication may include an e-mail message.

In some implementations of the system, providing the feedback may include delivering the feedback in an e-mail to an e-mail account associated with the user.

In some implementations of the system, providing the feedback may include at least one of delivering the feedback in an e-mail to an e-mail account associated with the user, delivering the feedback in a text message to a phone number associated with the user. In some implementations of the system, the processor(s) may be configured to deliver the feedback in an electronic format to an account associated with the user, or delivering the feedback to a web portal accessible to the user.

Another aspect of the present disclosure relates to a method for providing contextual feedback to a user of a suspected phishing attack. The method may include configuring, via a processor, a plurality of rules. Each rule may be associated with an indication of a suspicious activity and a feedback snippet corresponding to the indication of the suspicious activity. The method may include receiving, at the processor, a report of a suspicious electronic communication. The method may include triggering, at the processor, a rule of the plurality of rules based on the associated indication of the suspicious activity and the report of the suspicious electronic communication. The method may include generating, at the processor, feedback including the feedback snippet associated with each triggered rule. The method may include automatically providing the contextual feedback to the user.

In some implementations of the method, it may include sending, to the user, a survey for soliciting user feedback on the suspicious electronic message. In some implementations of the method, it may include receiving, from the user, a user response to the survey. In some implementations of the method, triggering the plurality of rules may be further based on the user response to the survey.

In some implementations of the method, the survey may include a close ended question prompting the user to select a reason for reporting the suspicious electronic communication.

In some implementations of the method, the survey may include a close ended question prompting the user to identify whether they interacted with the suspicious electronic communication.

In some implementations of the method, it may include receiving, from the user, a feedback rating selected by the user in response to the feedback provided to the user.

In some implementations of the method, it may include configuring, at the processor, a report function for incorporation into an e-mail client. In some implementations of the method, the processor may receive the report of the suspicious electronic communication in response to the user engaging the report function.

In some implementations of the method, the report of the suspicious electronic message may include the suspicious electronic message.

In some implementations of the method, it may include generating an initial threat level based on assessing the suspicious electronic communication against common indicators of a malicious electronic communication.

In some implementations of the method, it may include configuring each of the plurality of rules to include an associated threat level corresponding to the indication of the suspicious activity. In some implementations of the method, it may include generating a final threat level based on the initial threat level and the associated threat level for each triggered rule. In some implementations of the method, the feedback may further include the final threat level.

In some implementations of the method, the feedback snippet may include text and graphics for educating the user on a risk associated with the indication of suspicious activity.

In some implementations of the method, the feedback snippet may include text for educating the user on a behaviour for avoiding a risk associated with the indication of the suspicious activity.

In some implementations of the method, the feedback may include ordering the feedback snippets in a digest.

In some implementations of the method, the plurality of rules may be configured in an ordered sequence.

In some implementations of the method, generating the feedback may further include presenting the feedback snippets in an order corresponding to the ordered sequence of the plurality of rules.

In some implementations of the method, the plurality of rules may be configured for triggering based on boolean logic.

In some implementations of the method, the plurality of rules may include a rule wherein the associated indication of the suspicious activity includes a user interaction with the suspicious electronic communication.

In some implementations of the method, the plurality of rules may include a rule wherein the associated indication of the suspicious activity includes a malicious link.

In some implementations of the method, the report of the suspicious electronic communication may do not trigger any of the plurality of rules and the feedback includes a snippet advising of a likely safe electronic communication.

In some implementations of the method, the electronic communication may include an e-mail message.

In some implementations of the method, providing the feedback may include delivering the feedback in an e-mail to an e-mail account associated with the user.

In some implementations of the method, providing the feedback may include at least one of delivering the feedback in an e-mail to an e-mail account associated with the user, delivering the feedback in a text message to a phone number associated with the user. In some implementations of the method, it may include delivering the feedback in an electronic format to an account associated with the user, or delivering the feedback to a web portal accessible to the user or a mobile app accessible to the user.

Yet another aspect of the present disclosure relates to a non-transient computer-readable storage medium having instructions embodied thereon, the instructions being executable by one or more processors to perform a method for providing contextual feedback to a user of a suspected phishing attack. The method may include configuring, via a processor, a plurality of rules. Each rule may be associated with an indication of a suspicious activity and a feedback snippet corresponding to the indication of the suspicious activity. The method may include receiving, at the processor, a report of a suspicious electronic communication. The method may include triggering, at the processor, a rule of the plurality of rules based on the associated indication of the suspicious activity and the report of the suspicious electronic communication. The method may include generating, at the processor, feedback including the feedback snippet associated with each triggered rule. The method may include automatically providing the contextual feedback to the user.

In some implementations of the computer-readable storage medium, the method may include sending, to the user, a survey for soliciting user feedback on the suspicious electronic message. In some implementations of the computer-readable storage medium, the method may include receiving, from the user, a user response to the survey. In some implementations of the computer-readable storage medium, triggering the plurality of rules may be further based on the user response to the survey.

In some implementations of the computer-readable storage medium, the survey may include a close ended question prompting the user to select a reason for reporting the suspicious electronic communication.

In some implementations of the computer-readable storage medium, the survey may include a close ended question prompting the user to identify whether they interacted with the suspicious electronic communication.

In some implementations of the computer-readable storage medium, the method may include receiving, from the user, a feedback rating selected by the user in response to the feedback provided to the user.

In some implementations of the computer-readable storage medium, the method may include configuring, at the processor, a report function for incorporation into an e-mail client. In some implementations of the computer-readable storage medium, the processor may receive the report of the suspicious electronic communication in response to the user engaging the report function.

In some implementations of the computer-readable storage medium, the report of the suspicious electronic message may include the suspicious electronic message.

In some implementations of the computer-readable storage medium, the method may include generating an initial threat level based on assessing the suspicious electronic communication against common indicators of a malicious electronic communication.

In some implementations of the computer-readable storage medium, the method may include configuring each of the plurality of rules to include an associated threat level corresponding to the indication of the suspicious activity. In some implementations of the computer-readable storage medium, the method may include generating a final threat level based on the initial threat level and the associated threat level for each triggered rule. In some implementations of the computer-readable storage medium, the feedback may further include the final threat level.

In some implementations of the computer-readable storage medium, the feedback snippet may include text for educating the user on a risk associated with the indication of suspicious activity.

In some implementations of the computer-readable storage medium, the feedback snippet may include text for educating the user on a behaviour for avoiding a risk associated with the indication of the suspicious activity.

In some implementations of the computer-readable storage medium, the feedback may include ordering the feedback snippets in a digest.

In some implementations of the computer-readable storage medium, the plurality of rules may be configured in an ordered sequence.

In some implementations of the computer-readable storage medium, generating the feedback may further include presenting the feedback snippets in an order corresponding to the ordered sequence of the plurality of rules.

In some implementations of the computer-readable storage medium, the plurality of rules may be configured for triggering based on boolean logic.

In some implementations of the computer-readable storage medium, the plurality of rules may include a rule wherein the associated indication of the suspicious activity includes a user interaction with the suspicious electronic communication.

In some implementations of the computer-readable storage medium, the plurality of rules may include a rule wherein the associated indication of the suspicious activity includes a malicious link.

In some implementations of the computer-readable storage medium, the report of the suspicious electronic communication may do not trigger any of the plurality of rules and the feedback includes a snippet advising of a likely safe electronic communication.

In some implementations of the computer-readable storage medium, the electronic communication may include an e-mail message.

In some implementations of the computer-readable storage medium, providing the feedback may include delivering the feedback in an e-mail to an e-mail account associated with the user.

In some implementations of the computer-readable storage medium, providing the feedback may include at least one of delivering the feedback in an e-mail to an e-mail account associated with the user, delivering the feedback in a text message to a phone number associated with the user. In some implementations of the computer-readable storage medium, the method may include delivering the feedback in an electronic format to an account associated with the user, or delivering the feedback to a web portal accessible to the user.

Still another aspect of the present disclosure relates to a system configured for providing contextual feedback to a user of a suspected phishing attack. The system may include means for configuring, via a processor, a plurality of rules. Each rule may be associated with an indication of a suspicious activity and a feedback snippet corresponding to the indication of the suspicious activity. The system may include means for receiving, at the processor, a report of a suspicious electronic communication. The system may include means for triggering, at the processor, a rule of the plurality of rules based on the associated indication of the suspicious activity and the report of the suspicious electronic communication. The system may include means for generating, at the processor, feedback including the feedback snippet associated with each triggered rule. The system may include means for automatically providing the contextual feedback to the user.

In some implementations of the system, the system may include means for sending, to the user, a survey for soliciting user feedback on the suspicious electronic message. In some implementations of the system, the system may include means for receiving, from the user, a user response to the survey. In some implementations of the system, triggering the plurality of rules may be further based on the user response to the survey.

In some implementations of the system, the survey may include a close ended question prompting the user to select a reason for reporting the suspicious electronic communication.

In some implementations of the system, the survey may include a close ended question prompting the user to identify whether they interacted with the suspicious electronic communication.

In some implementations of the system, the system may include means for receiving, from the user, a feedback rating selected by the user in response to the feedback provided to the user.

In some implementations of the system, the system may include means for configuring, at the processor, a report function for incorporation into an e-mail client. In some implementations of the system, the processor may receive the report of the suspicious electronic communication in response to the user engaging the report function.

In some implementations of the system, the report of the suspicious electronic message may include the suspicious electronic message.

In some implementations of the system, the system may include means for generating an initial threat level based on assessing the suspicious electronic communication against common indicators of a malicious electronic communication.

In some implementations of the system, the system may include means for configuring each of the plurality of rules to include an associated threat level corresponding to the indication of the suspicious activity. In some implementations of the system, the system may include means for generating a final threat level based on the initial threat level and the associated threat level for the each triggered rule. In some implementations of the system, the feedback may further include the final threat level.

In some implementations of the system, the feedback snippet may include text for educating the user on a risk associated with the indication of suspicious activity.

In some implementations of the system, the feedback snippet may include text for educating the user on a behaviour for avoiding a risk associated with the indication of the suspicious activity.

In some implementations of the system, the feedback may include ordering the feedback snippets in a digest.

In some implementations of the system, the plurality of rules may be configured in an ordered sequence.

In some implementations of the system, generating the feedback may further include presenting the feedback snippets in an order corresponding to the ordered sequence of the plurality of rules.

In some implementations of the system, the plurality of rules may be configured for triggering based on boolean logic.

In some implementations of the system, the plurality of rules may include a rule wherein the associated indication of the suspicious activity includes a user interaction with the suspicious electronic communication.

In some implementations of the system, the plurality of rules may include a rule wherein the associated indication of the suspicious activity includes a malicious link.

In some implementations of the system, the report of the suspicious electronic communication may do not trigger any of the plurality of rules and the feedback includes a snippet advising of a likely safe electronic communication.

In some implementations of the system, the electronic communication may include an e-mail message.

In some implementations of the system, providing the feedback may include delivering the feedback in an e-mail to an e-mail account associated with the user.

In some implementations of the system, providing the feedback may include at least one of delivering the feedback in an e-mail to an e-mail account associated with the user, delivering the feedback in a text message to a phone number associated with the user. In some implementations of the system, the system may include means for delivering the feedback in an electronic format to an account associated with the user, or delivering the feedback to a web portal accessible to the user.

Even another aspect of the present disclosure relates to a computing platform configured for providing contextual feedback to a user of a suspected phishing attack. The computing platform may include a non-transient computer-readable storage medium having executable instructions embodied thereon. The computing platform may include one or more hardware processors configured to execute the instructions. The processor(s) may execute the instructions to configure, via a processor, a plurality of rules. Each rule may be associated with an indication of a suspicious activity and a feedback snippet corresponding to the indication of the suspicious activity. The processor(s) may execute the instructions to receive, at the processor, a report of a suspicious electronic communication. The processor(s) may execute the instructions to trigger, at the processor, a rule of the plurality of rules based on the associated indication of the suspicious activity and the report of the suspicious electronic communication. The processor(s) may execute the instructions to generate, at the processor, feedback including the feedback snippet associated with each triggered rule. The processor(s) may execute the instructions to automatically provide the contextual feedback to the user.

In some implementations of the computing platform, the processor(s) may execute the instructions to send, to the user, a survey for soliciting user feedback on the suspicious electronic message. In some implementations of the computing platform, the processor(s) may execute the instructions to receive, from the user, a user response to the survey. In some implementations of the computing platform, triggering the plurality of rules may be further based on the user response to the survey.

In some implementations of the computing platform, the survey may include a close ended question prompting the user to select a reason for reporting the suspicious electronic communication.

In some implementations of the computing platform, the survey may include a close ended question prompting the user to identify whether they interacted with the suspicious electronic communication.

In some implementations of the computing platform, the processor(s) may execute the instructions to receive, from the user, a feedback rating selected by the user in response to the feedback provided to the user.

In some implementations of the computing platform, the processor(s) may execute the instructions to configure, at the processor, a report function for incorporation into an e-mail client. In some implementations of the computing platform, the processor may receive the report of the suspicious electronic communication in response to the user engaging the report function.

In some implementations of the computing platform, the report of the suspicious electronic message may include the suspicious electronic message.

In some implementations of the computing platform, the processor(s) may execute the instructions to generate an initial threat level based on assessing the suspicious electronic communication against common indicators of a malicious electronic communication.

In some implementations of the computing platform, the processor(s) may execute the instructions to configure each of the plurality of rules to include an associated threat level corresponding to the indication of the suspicious activity. In some implementations of the computing platform, the processor(s) may execute the instructions to generate a final threat level based on the initial threat level and the associated threat level for the each triggered rule. In some implementations of the computing platform, the feedback may further include the final threat level.

In some implementations of the computing platform, the feedback snippet may include text for educating the user on a risk associated with the indication of suspicious activity.

In some implementations of the computing platform, the feedback snippet may include text for educating the user on a behaviour for avoiding a risk associated with the indication of the suspicious activity.

In some implementations of the computing platform, the feedback may include ordering the feedback snippets in a digest.

In some implementations of the computing platform, the plurality of rules may be configured in an ordered sequence.

In some implementations of the computing platform, generating the feedback may further include presenting the feedback snippets in an order corresponding to the ordered sequence of the plurality of rules.

In some implementations of the computing platform, the plurality of rules may be configured for triggering based on boolean logic.

In some implementations of the computing platform, the plurality of rules may include a rule wherein the associated indication of the suspicious activity includes a user interaction with the suspicious electronic communication.

In some implementations of the computing platform, the plurality of rules may include a rule wherein the associated indication of the suspicious activity includes a malicious link.

In some implementations of the computing platform, the report of the suspicious electronic communication may do not trigger any of the plurality of rules and the feedback includes a snippet advising of a likely safe electronic communication.

In some implementations of the computing platform, the electronic communication may include an e-mail message.

In some implementations of the computing platform, providing the feedback may include delivering the feedback in an e-mail to an e-mail account associated with the user.

In some implementations of the computing platform, providing the feedback may include at least one of delivering the feedback in an e-mail to an e-mail account associated with the user, delivering the feedback in a text message to a phone number associated with the user. In some implementations of the computing platform, the processor(s) may execute the instructions to deliver the feedback in an electronic format to an account associated with the user, or delivering the feedback to a web portal accessible to the user.

One aspect of the present disclosure relates to a computing platform configured for providing contextual feedback to a user of a suspected phishing attack. The computing platform may include a non-transient computer-readable storage medium having executable instructions embodied thereon. The computing platform may include one or more hardware processors configured to execute the instructions. The processor(s) may execute the instructions to configure, via a processor, a plurality of rules. Each rule may be associated with an indication of a suspicious activity and a feedback snippet corresponding to the indication of the suspicious activity. The processor(s) may execute the instructions to receive, at the processor, a report of a suspicious electronic communication. The processor(s) may execute the instructions to trigger, at the processor, a rule of the plurality of rules based on the associated indication of the suspicious activity and the report of the suspicious electronic communication. The processor(s) may execute the instructions to generate, at the processor, feedback including the feedback snippet associated with each triggered rule. The processor(s) may execute the instructions to automatically provide the contextual feedback to the user.

Another aspect of the present disclosure relates to a method for providing contextual feedback to a user of a suspected phishing attack. The method may include configuring, via a processor, a plurality of rules. Each rule may be associated with an indication of a suspicious activity and a feedback snippet corresponding to the indication of the suspicious activity. The method may include receiving, at the processor, a report of a suspicious electronic communication. The method may include triggering, at the processor, a rule of the plurality of rules based on the associated indication of the suspicious activity and the report of the suspicious electronic communication. The method may include generating, at the processor, feedback including the feedback snippet associated with each triggered rule. The method may include automatically providing the contextual feedback to the user.

Yet another aspect of the present disclosure relates to a non-transient computer-readable storage medium having instructions embodied thereon, the instructions being executable by one or more processors to perform a method for providing contextual feedback to a user of a suspected phishing attack. The method may include configuring, via a processor, a plurality of rules. Each rule may be associated with an indication of a suspicious activity and a feedback snippet corresponding to the indication of the suspicious activity. The method may include receiving, at the processor, a report of a suspicious electronic communication. The method may include triggering, at the processor, a rule of the plurality of rules based on the associated indication of the suspicious activity and the report of the suspicious electronic communication. The method may include generating, at the processor, feedback including the feedback snippet associated with each triggered rule. The method may include automatically providing the contextual feedback to the user.

Yet another aspect of the present disclosure relates to a method for providing feedback to a user of a suspected cybersecurity attack. The method may include configuring, via a processor, a plurality of rules, each. Each rule may include a triggerable criterion associated with an electronic communication, and a feedback snippet having information corresponding to the triggerable criterion. The method may include receiving, at the processor, a report of a potentially malicious electronic communication. The method may include, analyzing the report of the potentially malicious electronic communication based on triggering the plurality of rules. The method may include generating user feedback comprising the feedback snippet associated with each of the criterion triggered during the analysis. The method may include automatically providing the user feedback to the user. In a related aspect, the present disclosure provides a non-transient computer-readable storage medium having instructions embodied thereon, the instructions being executable by one or more processors to perform a method for providing feedback to a user of a suspected cybersecurity attack. In yet another related aspect, the present disclosure provides a computing platform configured for providing feedback to a user of a suspected cybersecurity attack. The computing platform may include a non-transient computer-readable storage medium having executable instructions embodied thereon, wherein the executable instructions relate to a method for providing feedback to a user of a suspected cybersecurity attack. The computing platform may include one or more hardware processors configured to execute the instructions.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

A solution to addressing cybersecurity attacks, such as phishing attacks, may include providing users with the ability to report electronic communications, including but not limited to reporting e-mails, text messages, direct messages as may be sent on social media platforms, messages sent via enterprise solutions, messages sent via communication platforms such as Microsoft Teams™ and Slack™, and so forth. A user may initiate the reporting process, for example, using a reporting tool incorporated into an application used to receive and interact with the electronic communication. Embodiments in accordance with the present disclosure, may incorporate a reporting tool, such as a report function, report macro, or report button, into a user interface of an application used for sending and receiving electronic communications, such as incorporating a reporting tool into an email client used for sending and receiving e-mails. A user may use the reporting tool to report an electronic communication that they suspect may be a cybersecurity threat. Reporting an electronic communication may result in providing the electronic communication, metadata of the electronic communication, and/or a summary report thereof—among other information—to an Information Technology (IT) department or other persons, applications, or systems equipped to conduct analysis on the electronic communication. Reporting the electronic communication may also result in temporarily quarantining the electronic communication from the user at least until completing analysis.

Analysis on the report may include but is not limited to, detecting malicious links, attachments, spyware, malware, and/or other activities or indicators of a potential cybersecurity attack; analyzing syntax, semantics, pragmatics, and morphology; analyzing keywords, phrases, and/or symbols associated with cybersecurity attacks (e.g. mention of bitcoin, homoglyphs); analyzing for the use of deprecated e-mail standards for character creation and formation designed to bypass traditional e-mail filters such as the use of the byte-order-mark or the use of zero-point fonts. As an illustrative example, analyzing an electronic communication comprising an e-mail message may include analyzing standard e-mail headers to determine if there are any signs that the e-mail is fraudulently impersonating a sender or is from a sender or IP address that has previously been identified as sending malicious electronic communications. Examples of further analysis may include automatically examining the electronic communication for key words and phrases that when considered with electronic communication headers, provides strong evidence that the electronic communication is malicious. As an illustrative example, an e-mail sent from a Gmail account claiming to be from the CEO of a client firm using the technology can be compared to rules around what a legitimate e-mail would look like. In another embodiment, rules may be configured based on IT policy for a particular company, a particular user, or other entity, to provide feedback to users when they suspect a message may be malicious, but it is in fact non-malicious.

Based on the analysis, further action may be taken. For example, analysis may identify an electronic communication lacking any indicators of malicious or suspicious activity and rather having indicators of legitimate activity. Consequently the user may be free to interact with the electronic communication. Analysis may also identify a malicious electronic communications warranting further action such as taking action to prevent the user from further accessing the electronic communication. Embodiments in accordance with the present disclosure may include taking one or more of the following actions, or other actions not specifically listed, in response to identifying an indicator corresponding to an electronic communication, such as an indicator of a suspicious activity or malicious activity—such as an indicator of a cybersecurity threat—or such as an indicator of a legitimate activity: adjusting a threat score relative to a threat posed by the indicator; setting a threat score based on an absolute value of a threat score relating to the indicator; deleting the electronic communication to prevent a user from accessing the electronic communication, for example, by deleting the e-mail from the user's e-mail account; deleting the electronic communication from all users who may have received it, for example, in response to report from a user of a malicious e-mail, the malicious e-mail may be deleted from an inbox of all users who received the malicious e-mail; forwarding a copy of the electronic communication as an attachment in a further electronic communication to one or more person(s) for review, for example, forwarding the electronic communication as an attachment in an e-mail to one or more person(s) in an IT department for their review; defanging, neutralizing, or otherwise removing malicious threats present in the electronic communication, for example, removing any malicious links and/or attachments, and further providing the modified electronic communication to the user; providing a reward to a user in response to reporting a malicious electronic communication, in an embodiment, the reward may be based on a threat score associated with the electronic communication; providing feedback snippets to the user corresponding to each indicator of a suspicious or malicious activity—such as an indication of a cybersecurity threat—or indicator of a legitimate activity, detected in the electronic communication; and/or, applying one or more tags and/or categories to the electronic communication for reporting purposes, for example, to be used in subsequent rules configured for detecting an indicator of a suspicious or malicious activity, such as a cybersecurity threat, or an indicator of a legitimate activity.

In some cases, users may receive a further notification indicating whether the purportedly suspicious electronic communication was indeed malicious or otherwise benign. Often, however, users do not receive feedback or otherwise do not receive contextual feedback, especially at scale in companies or enterprises that may receive or otherwise triage in excess of ten-of-thousands of monthly cybersecurity attacks in relation to electronic communications. The absence of meaningful feedback may decrease user morale due to a user's uncertainty as to whether the electronic communication they reported was (or was not) part of a cybersecurity attack and as to whether their efforts in reporting the electronic communication were worthwhile. Furthermore, failing to provide feedback results in a missed opportunity to better educate and improve user capabilities to identify and respond to cybersecurity attacks.

Another solution to addressing cybersecurity attacks, such as phishing attacks, may include providing training and educational resources to users. For example, companies may implement anti-phishing education programs including ones that use phishing simulations to assist in reducing susceptibility to phishing attacks and may include a particular focus on training individuals to report electronic communications. However, simulations fail to address an emerging gap in providing users feedback on non-simulated electronic communications, both to confirm whether an electronic communication was indeed malicious or to provide feedback if the message was legitimate. For example, as users become more adept at reporting electronic communications, thereto may be a corresponding increase in the volume of electronic communications that require generating user feedback for, creating additional IT burden. As an illustrative example, a training program for reporting electronic communications may result in a 90% increase in reported electronic communications within 3 months of onboarding, and a 240% increase in reported electronic communications within 24 months of onboarding, creating significant demand on IT resources to provide feedback to users who report the electronic communications.

For example, a company may simulate phishing attacks for use in training users to better identify and respond to phishing attacks. In a training scenario for example, a user may receive an electronic communication modified to emulate malicious or suspicious activity indicative of a cybersecurity threat though the communication itself is benign and harmless, providing users with a safe environment to evaluate and identify cybersecurity attacks. Feedback may be provided to the user based on the electronic communication and how the user interacts with the electronic communication, to better educate the user on what was (or was not) potentially malicious about the electronic communication, or what was improper (or proper) about how the user interacted with the electronic communication. However, simulated cybersecurity attacks may have limited value in training users. For example, users participating in training may be primed to identify benign indicators as malicious as a result of heightened vigilance, which may increase false-positive reporting. Furthermore, providing feedback in simulated scenarios is predicated on a priori knowledge of what is known to be purportedly malicious about the simulated attack. Further yet, the simulated scenarios may lack the breadth and creativity of real cybersecurity attacks and may provide a narrower scope of experiences that do not adequately prepare users for real world scenarios.

Another solution to addressing cybersecurity attacks, such as phishing attacks, is to provide user feedback in response to the user reporting a real electronic communication. In an aspect, the present disclosure provides systems and methods for delivering contextual feedback based on a plurality of rules configured to detect malicious electronic communications, each rule corresponding to a snippet of feedback of an indicator of a suspicious or otherwise malicious activity, such as an indication of a cybersecurity threat, or of a snippet of feedback of an indicator of a legitimate activity. For example, in response to a user reporting an electronic communication, the systems and methods disclosed herein may deliver contextual feedback to the user comprising feedback snippets corresponding to each rule triggered by the electronic communication. In this regard, the systems and methods as disclosed herein automate the process of providing feedback to users, allowing for scaling-up of providing feedback at large enterprises. Furthermore, the systems and methods as disclosed herein allow for customizing rules and feedback, providing enhanced flexibility to address cybersecurity threats. Further yet, the systems and methods as disclosed herein provide contextual feedback to users based on which rules the electronic communication triggered, thereby providing tailored feedback to educate the user and enhance their skills and abilities to detect and respond to malicious electronic communications. Even further yet, the systems and methods disclosed herein may be implemented at a centralized node for receiving reports of purportedly malicious electronic communications from a plurality of users, such as for example, implemented within an IT department of an enterprise having a large number of employees and/or users.

FIG. 1 illustrates a system 100 configured for providing contextual feedback to a user reporting a suspected cybersecurity attack, such as a phishing attack, in accordance with one or more embodiments. In some embodiments, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of rule configuration module 108, report receiving module 110, rule trigger module 112, feedback generating module 114, feedback providing module 116, survey sending module 118, user response receiving module 120, feedback rating receiving module 122, report function configuration module 124, threat level generating module 126, and/or other instruction modules.

Rule configuration module 108 may be configured to configure, via a processor, a plurality of rules. Each rule may be associated with an indicator of activity corresponding to an electronic communication, such as an indicator of a suspicious activity, such as an indication of a malicious activity or cybersecurity threat, or an indication of a legitimate activity, and a feedback snippet corresponding to the indicator. Examples of indicators include, but are not limited to, indicators relating to electronic communication headers, such as e-mail headers and security information such as Sender Protection Framework (SPF), Domain-based Message Authentication Reporting and Conformance (DMARC), and DomainKeys Identified Mail (DKIM) that may be used in identifying fraudulent senders, for example, senders known for spoofing. Or for example indicators relating to electronic communication headers such as e-mail headers provided by client internal on premise e-mail servers or cloud e-mail provides, the presence of such headers combined with for example, e-mail headers such as SPF, DKIM, and/or DMARC may provide further and improved indications of both fraudulent senders and/or verified senders. Or for example, indicators relating to electronic communication headers such as e-mail headers included in messages by enterprise and/or client security tools. For example, rules may be configured based on threat scoring information provided by secure e-mail gateways, for example, to reduce legitimate messages from being stopped from delivery to end users due to false positive results as an organization may configure e-mail filters to include high tolerance for potentially malicious e-mails to combat false-positive reporting, as lower scored e-mails in combination with an end-user reporting the e-mail may provide a stronger indication of a cybersecurity threat. Or for example, indicators relating to detecting key words or phrases, that may be contained for example in the name of the sender, body of the electronic communication, title or subject line of the electronic communication, requests for passwords and/or password resets, account information, personal information, and/or other private, confidential or otherwise secret information. As an illustrative example, an indication of suspicious activity may relate to an e-mail sender named as an IT administrator and wherein the e-mail account is associated with a non-company domain, such as a Gmail account, suggesting that the e-mail has been spoofed. Or for example, indicators relating to a credibility or skill rating of the user who reports the electronic communication, for example, a user may have a credibility score based on performance in previous training and/or based on how reliable they have been at previously reporting electronic communications as safe or unsafe and/or based on a score manually entered by an administrator or the like. Or for example, indicators relating to a domain of the sender, for example, an e-mail domain including an age or vintage of the domain or indications of the domain's previous use in cybersecurity attacks. Or for example, indicators relating to an origin of the electronic communication, such as an IP address of the sending e-mail server or a phone number of the text message, and for example, whether the electronic communication originates from an origin relating to previous or known cybersecurity attacks. Embodiments in accordance with the present disclosure may further include indicators relating to a plurality of criteria, for example, an indicator may include a combination of indicators, for example, an indicator relating to a header of the electronic communication in combination with keywords and phrases contained in the electronic communication. Accordingly, an e-mail from a verified IT administrator providing instructions for resetting a company password may not trigger an indicator of suspicious activity and may rather trigger an indicator of legitimate activity.

As an illustrative example of a rule configured in accordance with the present disclosure, consider a malicious link as an indicator of suspicious activity. Accordingly, it may be desirable to configure rules in relation to malicious links in electronic communications. For example, an indicator of suspicious activity may include the presence of a malicious link in the electronic communication wherein an associated rule may trigger based on detecting the presence of the malicious link. As another example, an indicator of suspicious activity may include a user interacting with a link from an unknown sender wherein the associated rule may trigger based on whether the sender of the electronic communication is known to the user and whether the user clicked the link. In an embodiment, the plurality of rules may be configured for triggering based on boolean logic.

Each rule of the plurality of rules is further configured to include a feedback snippet associated with the indicator of activity corresponding to the reported electronic communication, for use in providing contextual feedback to the user. For example, a feedback snippet associated with a rule for a malicious link may include contextual information relevant to malicious links, such as: how to identify a malicious link, risks associated with malicious links, best practices for avoiding malicious links, what to do in case of clicking a malicious link, and so forth. Thus, in addition to improving user engagement in reporting potentially malicious electronic communications through feedback, the snippets also provide information tailored to the specific indicators of the electronic communication, for use in improving a user's ability to detect, mitigate, and avoid cybersecurity attacks. Embodiments of a feedback snippet may include information for educating a user on a risk associated with an indicator of a suspicious activity. Embodiments of a feedback snippet may include information relating to a behaviour for avoiding a risk associated with an indicator of a suspicious activity. Embodiments of a feedback snippet may include an indication that the electronic communication does not appear to be malicious. Embodiments of a feedback snippet may include an indication that the electronic communication comprises legitimate activity. Embodiments of a feedback snippet may include, text, graphics, icons, gifs, videos, visual effects, audio and audio effects, and/or other digital assets, for use in presenting information to a user.

Embodiments in accordance with the present disclosure may include configuring the plurality of rules in an ordered sequence. For example, a plurality of N rules may be configured in a numerical order for use in analyzing a report of an electronic communication based on the numerical ordering, for example in order of rules from 1, 2, 3, . . . , to N-1, and N. For example, a first rule is applied to the report of the electronic communication, followed by applying the second rule, and so forth. Embodiments in accordance with the present disclosure include ordering feedback snippets in an order corresponding to the order of triggered rules. In an embodiment, the ordered sequence may correspond to a priority, risk, or other factor related to the rules or the associated with the indicator. For example, a rule associated with a high priority or high risk indicator of suspicious activity may be ordered at the beginning or near the beginning of the plurality of rules. In an embodiment each rule of the plurality of rules is configured to have an associated priority level. In an embodiment, the feedback provided to the users comprises feedback snippets arranged in an order based on the associated priority level of the corresponding triggered rule.

Evaluating rules in a sequential order may provide further advantages. For example, triggering a first rule may obviate the need to apply or trigger further rules that would otherwise act in contradiction to the first triggered rule, or for example, a rule may have an associated condition to stop further analysis upon triggering. As a further example, sequentially ordering rules may allow organizations to more readily identify legitimate electronic communications and prevent subsequent rules from triggering and causing confusion or otherwise acting improperly on user-feedback. As a further example, rules may act in a complimentary fashion, such as where triggering a rule may require first triggering a different rule. For example, a first rule may adjust a threat score from 2 to 7 and a subsequent second rule may trigger based on a threat score being greater than or equal to 5.

Embodiments in accordance with the present disclosure may include configuring the plurality of rules wherein each rule includes a threat level associated with the corresponding indication of suspicious activity or legitimate activity. Embodiments of a threat level include numerical representations such as a numerical rating from 1 to 10, wherein for example, a 1 may indicate a low risk or relatively low risk and 10 may indicate a high risk or relatively high risk. Embodiments of a threat level associated with the corresponding indicator may include labels, such as high, medium, or low risk. Embodiments of a feedback snippet may include the threat level associated with the corresponding indicator.

Report receiving module 110 may be configured to receive, at the processor, a report of a suspicious electronic communication. Embodiments of a report in accordance with the present disclosure include but are not limited to, a report comprising: a copy of the electronic communication, a copy of the electronic communication with links and attachments pre-emptively disabled and/or quarantined, metadata of the electronic communication, a summary of the electronic communication, and/or other information relevant to analyzing an electronic communication for cybersecurity threats. In an embodiment, the report may simply comprise a forwarded copy of the electronic communication. In an embodiment, the report may further comprise information about the user reporting the electronic communication, for example, information about the user or their account such as their e-mail address if the communication relates to an e-mail, or their phone number if the communication relates to a text message. In an embodiment, the report may further include a response from the user wherein the response includes additional information provided by the user in relation to the electronic communication and/or reasons for reporting it.

Embodiments in accordance with the present disclosure include incorporating a reporting tool, such as a report function, report macro, and/or report button, into an application configured for receiving and sending electronic communications, for use in generating a report of the electronic communication. Applications that may incorporate a reporting tool include but are not limited to: e-mail clients, social media platforms, text messages, communication applications such as Discord™ or Slack™, conferencing platforms such as Microsoft Teams™ or WebEx™, mobile applications, and other user interfaces used in the sending and receiving of electronic communications. In an embodiment, reporting the electronic communication may include providing an initial threat assessment based on common indicators of a malicious electronic communication. Examples of common indicators include, but are not limited to, indicators based on: electronic communication headers such as e-mail headers, keywords and phrases, and/or the presence of suspicious links or attachments such as documents with macros, executable files, compressed files and/or HTML files. In an embodiment, the initial threat assessment may include an initial threat rating, such as a threat score, and/or a label indicating a level of risk, such as high, medium, or low. In an embodiment, a report may be generated using SpamAssassin™, an Open Source anti-spam platform developed under the Apache v2.0 license, configured to provide a robust scoring framework and plug-ins to integrate a wide range of advanced heuristic and statistical analysis tests on email headers and body text including text analysis, Bayesian filtering, DNS blocklists, and collaborative filtering databases.

Rule trigger module 112 may be configured to trigger, at the processor, a rule of the plurality of rules, based on the associated indicator of activity corresponding to the electronic communication and the report of the suspicious electronic communication. For example, rule trigger module 112 may, parse, scan, analyze, identify or otherwise detect, based on the plurality of rules, an indication of suspicious activity or legitimate activity in the report of the electronic communication, thereby triggering an associated rule. Embodiments in accordance with the present disclosure include triggering the plurality of rules in accordance with an ordered sequence of the plurality of rules. Embodiments of triggering a rule may further include tabling, saving, storing, or otherwise queuing the associated feedback snippet for incorporation into feedback provided to the user. In an embodiment, the feedback may include a feedback snippet indicating that the electronic communication is likely not a suspicious or malicious electronic communication.

Feedback generating module 114 may be configured to generate, at the processor, feedback for the user, including incorporating the feedback snippet associated with each triggered rule into the feedback. Embodiments for generating feedback may include incorporating the feedback snippets in a digest or report for the user. Embodiments for generating feedback may further include presenting the feedback snippets in an order corresponding to the triggered order of the plurality of rules. Embodiments for generating feedback may comprise formatting the feedback snippet(s)

for compliance with a particular format, such as HTML. Embodiments for generating the feedback may further include incorporating visual or audio effects into the feedback including but not limited to, incorporating graphics, icons, gifs, videos, sounds, audio files, and other digital assets, for use in presenting information to a user. In an embodiment, the report of the suspicious electronic communication may not trigger any of the plurality of rules and the feedback may include generating a snippet that the electronic communication is likely not a suspicious or malicious electronic communication.

Feedback providing module 116 may be configured to automatically provide the contextual feedback to the user. Embodiments in accordance with the present disclosure include delivering feedback to the user after assessing all of the plurality of rules against the report of the electronic communication. Embodiments may further including delivering the feedback in a format associated with an application used by the user for sending and receiving electronic communications. For example, providing feedback may comprise delivering an e-mail to an e-mail account associated with the user. Further examples include, but are not limited to, sending feedback in a text message to a phone number associated with the user, sending an electronic message to an account associated with the user on Discord™, Slack™, Microsoft Teams™, and/or on other communication platforms, storing HTML formatted feedback in a web portal accessible to the user, and so forth. In an embodiment, providing feedback may include delivering the feedback to a plurality of accounts and/or platforms associated with or accessible to the user; for example, delivering the feedback in both an e-mail to an e-mail account associated with the user and sending a text message to a phone number associated with the user. In an embodiment, delivering feedback may comprise delivering a notification to a first account or communication platform associated with the user, such as a sending text notification to a phone number associated with the user to alert the user that the feedback is ready. In an embodiment, delivering feedback may comprise delivering feedback to second account or communication platform associated with a user, such as delivering the feedback in an e-mail to an e-mail account associated with the user. In an embodiment the first account or communication platform associated with the user for receiving a notification and the second account or communication platform associated with the user for receiving feedback are the same account.

Survey sending module 118 may be configured to send, to the user, a survey for use in soliciting user feedback on the suspicious electronic message. Embodiments in accordance with the present disclosure may include providing a survey to the user for use in soliciting information relating to the reasons why the user reported the electronic communication. For example, the survey may include questions such as: do you know the sender; were you expecting to receive an electronic communication from the sender; does the sender normally send attachments; and so forth. Embodiments of a survey may include close-ended questions. Embodiments of a survey may include a close ended question prompting the user to select a reason for reporting the suspicious electronic communication. In an embodiment, the survey may include a close ended question prompting the user to identify whether they interacted with the suspicious electronic communication.

User response receiving module 120 may be configured to receive, from the user, a user response to the survey. Embodiments in accordance with the present disclosure may include triggering a rule of the plurality of rules based on the user response to the survey. For example, the user response may indicate that the user interacted with the electronic communication, such as by forwarding the electronic communication to another person, which may trigger an associated rule and feedback snippet for incorporating into the feedback to be provided to the user.

Feedback rating receiving module 122 may be configured to receive, from the user, a feedback rating selected by the user in response to the feedback provided to the user. For example, the user may select a number of stars to rate a quality or relevance of the feedback, such as selecting 1 start (poor rating) up to 5 stars (good rating). In an embodiment, the feedback rating may include comments provided by the user.

Report function configuration module 124 may be configured to configure, at the processor, a reporting tool for incorporation into an e-mail client. Embodiments in accordance with the present disclosure include incorporating a reporting tool such as a report function, report macro, and/or report button into an application configured for receiving and sending electronic communications, for use in generating a report of the electronic communication. Embodiments in accordance with the present disclosure include incorporating a reporting tool into applications including but not limited to: e-mail clients, social media platforms, text messages, communication applications such as Discord™ or Slack™ conferencing platforms such as Microsoft Teams™ or WebEx™, mobile applications, and other user interfaces used in the sending and receiving of electronic communications. In an embodiment, the processor may receive the report of the electronic communication in response to the user interacting with the reporting tool, for example by the user clicking a report button.

Embodiments of generating a report in accordance with the present disclosure include but are not limited to, generating a report comprising: a copy of the electronic communication, a copy of the electronic communication with links and attachments pre-emptively disabled and/or quarantined, metadata of the electronic communication, a summary of the electronic communication, and/or other information relevant to analyzing an electronic communication for cybersecurity threats. In an embodiment, the report may simply comprise a forwarded copy of the electronic communication. In an embodiment, the report may further comprise information about the user reporting the electronic communication, for example, information about the user or their account such as their e-mail address if the communication relates to an e-mail, or their phone number if the communication relates to a text message. In an embodiment, the report may further include a response from the user wherein the response includes additional information provided by the user in relation to the electronic communication and/or reasons for reporting it.

In an embodiment, reporting the electronic communication may include providing an initial threat assessment based on common indicators of a malicious electronic communication. Examples of common indicators include, but are not limited to, indicators based on: electronic communication headers such as e-mail headers, keywords and phrases, and/or the presence of suspicious links and/or attachments such as documents with macros, executable files, compressed files, and/or HTML files. In an embodiment, the report tool may comprise SpamAssassin™, an Open Source anti-spam platform developed under the Apache v2.0 license and configured to provide a robust scoring framework and plug-ins to integrate a wide range of advanced heuristic and statistical analysis tests on email headers and body text including text analysis, Bayesian filtering, DNS blocklists, and collaborative filtering databases.

Threat level generating module 126 may be configured to generate an initial threat level based on assessing the suspicious electronic communication against common indicators of a malicious electronic communication. Embodiments in accordance with the present disclosure may include generating an initial threat level based on an initial threat assessment of the electronic communication. Embodiments in accordance with the present disclosure may include generating a final threat assessment based on using the associated threat level of triggered rules to modify an initial threat level. As an illustrative example, an initial threat assessment may identify relatively few or no indicators of a cybersecurity threat or may otherwise identify indicators of legitimate activity, resulting in a relatively low initial threat level, such as a score of 1 on a scale of 1 (low risk) to 10 (high risk). Further analysis may include applying a plurality of rules to the electronic communication, resulting in triggering one or more rules with higher associated threat levels than the initial threat level. As such, an initial threat level of 1 may be modified to generate a higher final threat level based on triggering rules with higher associated threat levels. Accordingly, generating a final threat level may include modifying the initial threat level based on the associated threat level of a triggered rule.

In some embodiments, computing platform(s) 102, remote platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 130 may be operatively linked via some other communication media.

A given remote platform 104 may include one or more processors configured to execute computer program modules. The computer program modules may be configured to enable an expert or user associated with the given remote platform 104 to interface with system 100 and/or external resources 130, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some embodiments, some or all of the functionality attributed herein to external resources 130 may be provided by resources included in system 100.

Computing platform(s) 102 may include electronic storage 132, one or more processors 134, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 132 may comprise non-transitory storage media that electronically stores information. The electronic storage media of electronic storage 132 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from computing platform(s) 102, information received from remote platform(s) 104, and/or other information that enables computing platform(s) 102 to function as described herein.

Processor(s) 134 may be configured to provide information processing capabilities in computing platform(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some embodiments, processor(s) 134 may include a plurality of processing units. These processing units may be physically located within the same device, or processor(s) 134 may represent processing functionality of a plurality of devices operating in coordination. Processor(s) 134 may be configured to execute modules 108, 110, 112, 114, 116, 118, 120, 122, 124, and/or 126, and/or other modules. Processor(s) 134 may be configured to execute modules 108, 110, 112, 114, 116, 118, 120, 122, 124, and/or 126, and/or other modules by software; hardware; firmware; some combination of software, hardware, and/or firmware; and/or other mechanisms for configuring processing capabilities on processor(s) 134. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, and/or 126, are illustrated in FIG. 1 as being implemented within a single processing unit, in embodiments in which processor(s) 134 includes multiple processing units, one or more of modules 108, 110, 112, 114, 116, 118, 120, 122, 124, and/or 126 may be implemented remotely from the other modules. The description of the functionality provided by the different modules 108, 110, 112, 114, 116, 118, 120, 122, 124, and/or 126, described below is for illustrative purposes, and is not intended to be limiting, as any of modules 108, 110, 112, 114, 116, 118, 120, 122, 124, and/or 126 may provide more or less functionality than is described. For example, one or more of modules 108, 110, 112, 114, 116, 118, 120, 122, 124, and/or 126 may be eliminated, and some or all of its functionality may be provided by other ones of modules 108, 110, 112, 114, 116, 118, 120, 122, 124, and/or 126. As another example, processor(s) 134 may be configured to execute one or more additional modules that may perform some or all of the functionality attributed below to one of modules 108, 110, 112, 114, 116, 118, 120, 122, 124, and/or 126.

Figure 2:
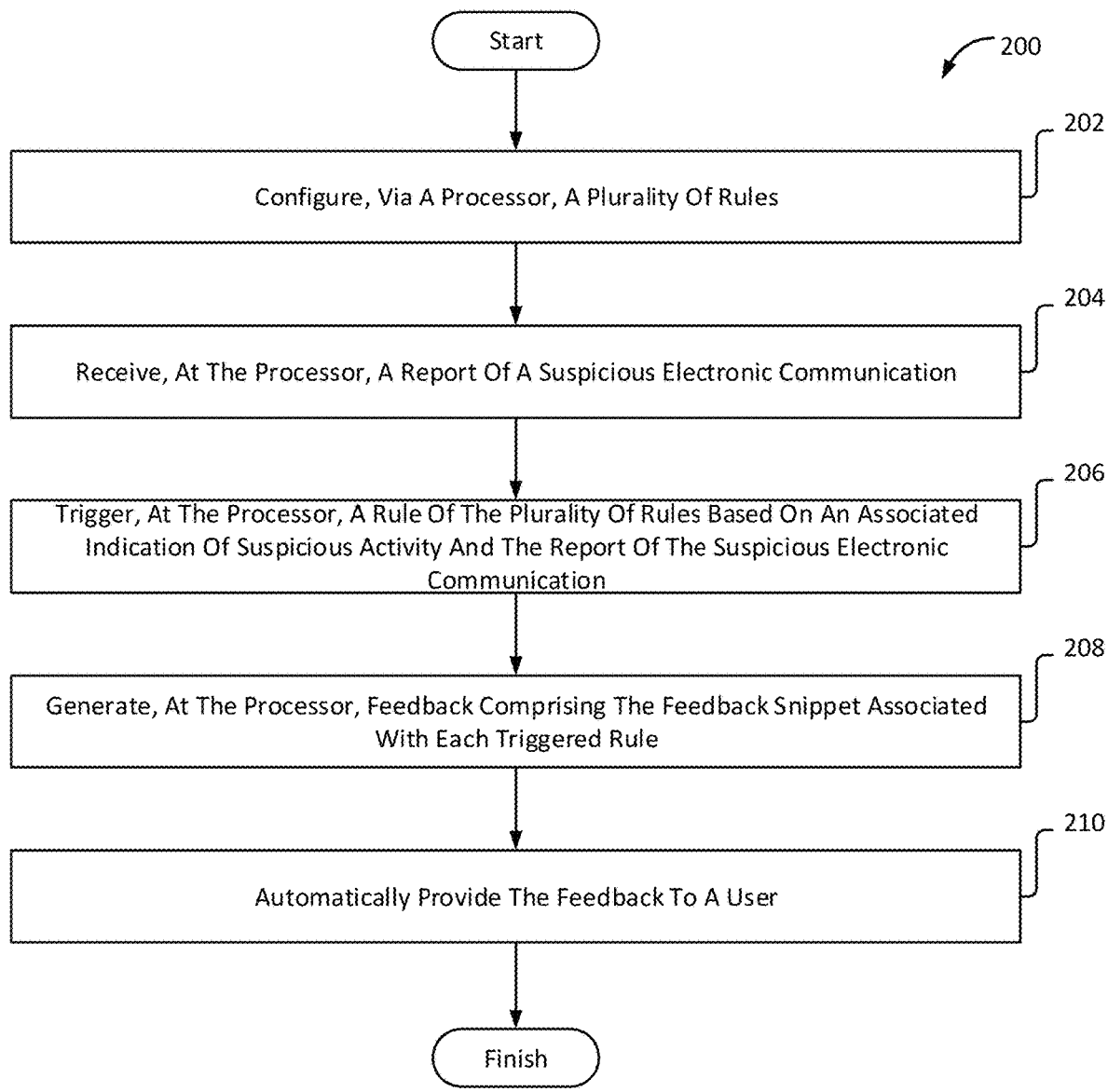
FIG. 2 illustrates a method for providing feedback to a user in response to the user reporting an electronic communication, in accordance with an embodiment of the present disclosure.

FIG. 2 illustrates a method 200 for providing contextual feedback to a user of a suspected cybersecurity attack, such as a phishing attack, in accordance with one or more embodiments. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include configuring, via a processor, a plurality of rules. Each rule may be associated with an indicator of activity corresponding to an electronic communication, for example an indication of a suspicious activity or a legitimate activity; and a feedback snippet corresponding to the indicator. Operation 202 may be performed by one or more hardware processors configured by machine-readable instructions including a module that is the same as or similar to rule configuration module 108, in accordance with one or more embodiments.

An operation 204 may include receiving, at the processor, a report of a suspicious electronic communication. Operation 204 may be performed by one or more hardware processors configured by machine-readable instructions including a module that is the same as or similar to report receiving module 110, in accordance with one or more embodiments.

An operation 206 may include triggering, at the processor, a rule of the plurality of rules based on the associated indicator and the report of the suspicious electronic communication. Operation 206 may be performed by one or more hardware processors configured by machine-readable instructions including a module that is the same as or similar to rule trigger module 112, in accordance with one or more embodiments.

An operation 208 may include generating, at the processor, feedback including the feedback snippet associated with each triggered rule. Operation 208 may be performed by one or more hardware processors configured by machine-readable instructions including a module that is the same as or similar to feedback generating module 114, in accordance with one or more embodiments.

An operation 210 may include automatically providing the contextual feedback to the user. Operation 210 may be performed by one or more hardware processors configured by machine-readable instructions including a module that is the same as or similar to feedback providing module 116, in accordance with one or more embodiments.

It should be appreciated that although the method 200 illustrates the operations 202, 204, 206, 208, and 210, generally relating to the modules 108, 110, 112, 114, and 116, respectively, a method in accordance with the present disclosure, such as the method 200, may include one or more further operations not illustrated, for use in implementing one or more modules described in relation to FIG. 1, including modules on or more of the modules 108, 110, 112, 114, 116, 118, 120, 122, 124, and/or 126, and/or other functionality and features not described in relation to the modules of FIG. 1.

Figure 3:
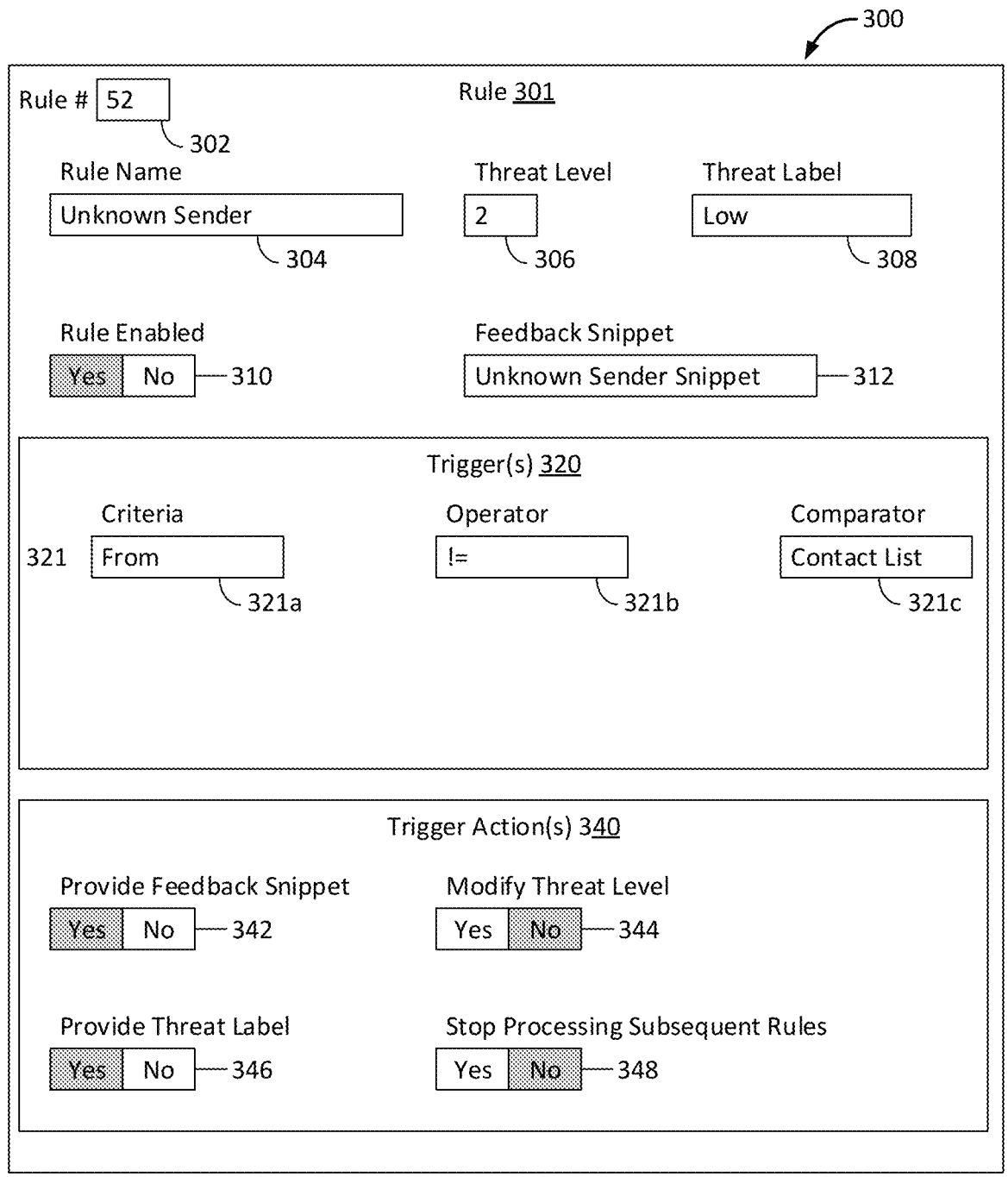
FIG. 3 illustrates a user interface element for creating and/or editing a rule for association with an indication of a suspicious activity, in accordance with the present disclosure.

FIG. 3 illustrates an example of a user interface element 300 for creating or editing a rule, such as rule 301, for use in configuring a plurality of rules in accordance with an embodiment of the present disclosure, for example, in accordance with one or more modules as disclosed herein, such as modules 108, 110, 112, 114, 116, 118, 120, 122, 124, and/or 126, and/or in accordance with one or more operations as disclosed herein, such as operations 202, 204, 206, 208, and/or 210.

The user interface element 300 may include a plurality of fields 302, 304, 306, 308, 312, 321a, 321b, 321c and/or other fields not illustrated; a plurality of buttons 310, 342, 344, 346, 348, and/or other buttons not illustrated; and/or other inputs, menus, and/or user interface elements not illustrated, for use in creating and/or editing, features, elements, and/or other aspects associated with a rule in accordance with the present disclosure.

As further described below, the rule 301 provides an illustrative example of a rule created for determining whether the reported electronic communication originates from an unknown sender. The rule 301 is associated with a feedback snippet 312 and an indication of suspicious activity based on a trigger 321 defined in association with fields 321a, 321b, and 321c. In this illustrative example, the trigger 321 is configured to assist in determining whether the received electronic communication is from an unknown sender. If the rule 301 triggers, further action may be taken based on the configuration of the plurality of trigger actions 340, such actions including providing a feedback snippet to the user, modifying a threat level of the electronic communication, providing a threat label with the feedback snippet, and continuing (or stopping) the processing of further rules.

The user interface element 300 may include a text box 302 for editing a rule number. In this illustrative example, the rule 300 is assigned a rule number of 52. Embodiments as disclosed herein may sequence a rule of a plurality of rules in accordance with the rule number 302. Embodiments as disclosed herein may compile feedback snippets for triggered rules in an order corresponding to the rule number 302. In an embodiment, the rule number corresponds to a priority of the rule.

The user interface element 300 may include a text box 304 for editing a rule name. The rule name may reflect a desired title for the rule, for example for use in identifying the nature of the rule. In this illustrative example, the rule 301 is assigned a rule name of Unknown Sender.

The user interface element 300 may include a text box 306 for assigning a threat level. In this illustrative example, the rule 301 is assigned a threat level of 2. Embodiments of a threat level in accordance with the present disclosure may include assigning a numerical value for use in quantizing a risk or threat level of an associated cybersecurity threat, such as a risk that may be associated with receiving an electronic communication from an unknown sender. Embodiments as disclosed herein may include assigning a numerical value, such as an integer, based on a predefined scale. For example, a predefined scale may provide a range of numerical values for assigning an integer threat level from 1-10, or for example, from 0-100. In an embodiment, a lower numerical value may be indicative of a lower cybersecurity threat level whereas a higher numerical value may be indicative of a higher cybersecurity threat level. Embodiments of the present disclosure may modify or assign a threat level to an electronic communication based on the threat level 306. Embodiments of the present disclosure may include incorporating the threat level 306 into an associated feedback snippet.

The user interface element 300 may include a text box 308 for assigning a threat label. In this illustrative example, the rule 301 is assigned a threat label of Low. Embodiments of threat label in accordance with the present disclosure may include assigning a qualitative descriptor of a risk or threat level for an associated cybersecurity threat, such as a risk that may be associated with receiving an electronic communication from an unknown sender. Embodiments of the present disclosure may include incorporating the threat label 308 into an associated feedback snippet.

The user interface element 310 may include a button 310 for enabling a rule for configuration. In this illustrative example, the Yes field of button 310 is selected, enabling the rule 301 for configuration into the plurality of rules used to analyze an electronic communication.

The user interface element 300 may include a text box 312 for associating a feedback snippet with a rule. In this illustrative example, the rule 301 is associated with the feedback snippet Unknown Sender Snippet. In an embodiment, the associated feedback snippet 312 is included in the feedback provided to the user when the rule is triggered. In an embodiment, the associated feedback snippet 312 may be sequenced in a feedback digest based on the rule number 302.

The user interface element 310 may include a plurality of triggers 320, for use in identifying an indicator of an activity corresponding to an electronic communications, such as an indicator of a suspicious or malicious activity, or legitimate activity, in an electronic communication. In this illustrative example, the rule 301 includes a single trigger 321 comprising a criteria 321a, a comparator 321c, and a boolean operator 321b for use in assessing the criteria against the comparator. In this particular example, the trigger 321 is based on checking whether the From field (i.e. criteria 321a) of an electronic communication Does Not (i.e. operator 321b) include a contact from the Contact List (i.e. comparator 321c) of the receiving party. Accordingly, if the sender of the reported electronic communication is not identified in the contact list of the recipient, the rule 301 triggers, and further action may be taken based on trigger actions 340. Embodiments as disclosed herein may include a rule comprising a plurality of triggers.

The user interface element 340 may include a plurality of trigger actions 340, for configuring what actions to take in response to triggering the rule. In this illustrative example, the plurality of actions 340 includes four buttons 342, 344, 346, and 348 for selectively enabling actions to Provide Feedback Snippet, Modify Threat Level, Provide Threat Label, and Stop Processing Subsequent Rules, respectively. In particular, when the conditions of trigger 321 are met, the rule 301 is selectively configured, based on buttons 342 and 346, to include the associated feedback snippet 312 and threat label 308 in feedback provided to the user; no action is taken with respect to modifying a threat level of the electronic communication based on button 344; and, processing of further rules will continue based on button 348.

FIG. 4 illustrates an example of a feedback digest 400 for use in providing feedback to a user in accordance with an embodiment of the present disclosure, for example, in accordance with one or more modules as disclosed herein, such as modules 108, 110, 112, 114, 116, 118, 120, 122, 124, and/or 126, and/or in accordance with one or more operations as disclosed herein, such as operations 202, 204, 206, 208, and/or 210.

A feedback digest in accordance with the present disclosure may include a plurality of feedback snippets in accordance with triggering one or more associated rules, and/or may include other information, visual effects, audio effects, and/or other aspects associated with providing feedback to a user in accordance with the present disclosure.

As further described below, the feedback digest 400 provides an illustrative example of a deliverable for providing feedback to a user who reported an electronic communication. In this illustrative example, the feedback digest 400 includes a first feedback snippet 410, a second feedback snippet 420, and a third feedback snippet 430, associated with one or more rules governing the analysis of an electronic communication. The feedback digest 400 and corresponding feedback snippets may be provided in a format compatible with an application used by the user. For example, the feedback digest 400 may be formatted as an e-mail and delivered to an e-mail account associated with a user. In another example, the feedback digest 400 may be formatted into a Portable Data Format (PDF) or word processing document, such as Microsoft WORD™, and may be included as an attachment in an e-mail delivered to an e-mail account associated with the user. As a further example, the feedback digest 400 may be formatted for delivery to the user via a message, such as in a text message delivered to a phone number associated with the user.

In this illustrative example, the feedback digest 400 includes a first feedback snippet 410. In an embodiment, the first feedback snippet 410 may comprise a default feedback snippet not associated with a triggered rule. In an embodiment, the first feedback snippet 410 may comprise a feedback associate snippet associated with a triggered rule and/or a response of the user. In this illustrative example, the first feedback snippet 410 comprises a default feedback snippet not associated with a triggered rule. As depicted in FIG. 4, the default snippet 410 includes summary information explaining why the user receives the feedback digest 400. Embodiments of a default feedback snippet may be customized in accordance with the preferences of a company and/or user, for use in providing tailored feedback.

In this illustrative example, the feedback digest 400 includes a second feedback snippet 420. In an embodiment, the second feedback snippet 420 may comprise a default feedback snippet not associated with a triggered rule. In an embodiment, the second feedback snippet 420 may comprise a feedback snippet associated with a triggered rule and/or a response of the user. In this illustrative example, the second feedback snippet 420 comprises a feedback snippet associated with a response of the user indicating that the user did not interact with the electronic communication. As depicted in FIG. 4, the feedback snippet 420 summarizes the purported action taken by the user and further advises of an additional action to take in the event of an indication of a malicious activity in relation to the electronic communication.

In this illustrative example, the feedback digest 400 includes a third feedback snippet 430. In an embodiment, the third feedback snippet 430 may comprise a default feedback snippet not associated with a triggered rule. In an embodiment, the third feedback snippet 430 may comprise a feedback snippet associated with a triggered rule and/or a response of the user. In this illustrative example, the third feedback snippet 430 comprises a feedback snippet associated with a rule that triggered based on an indication of spoofing detected in the electronic communication include. As depicted in FIG. 4, the feedback snippet 430 educates the user on how the electronic communication attempted to spoof. The feedback snippet 430 further includes a visual aid, in this instance a mask.

Embodiments of the present disclosure may include organizing feedback snippets in an order corresponding to an ordered sequence of the plurality of rules. Embodiments of the present disclosure may include assigning a default feedback snippet as the first feedback snippet presented in a feedback digest. Embodiments of the present disclosure may organize feedback snippets based on the type of snippet. For example, the first snippet(s) presented in the feedback provided to the user may relate to default snippets, or otherwise to snippets configured for automatic inclusion in all feedback provided to the user. The second snippet(s) presented in the feedback provided to the user may relate to feedback snippets associated with a response provided by the user. And, the third snippet(s) presented in the feedback provided to the user may relate to feedback snippets associated with a triggered rule.

Figure 5:
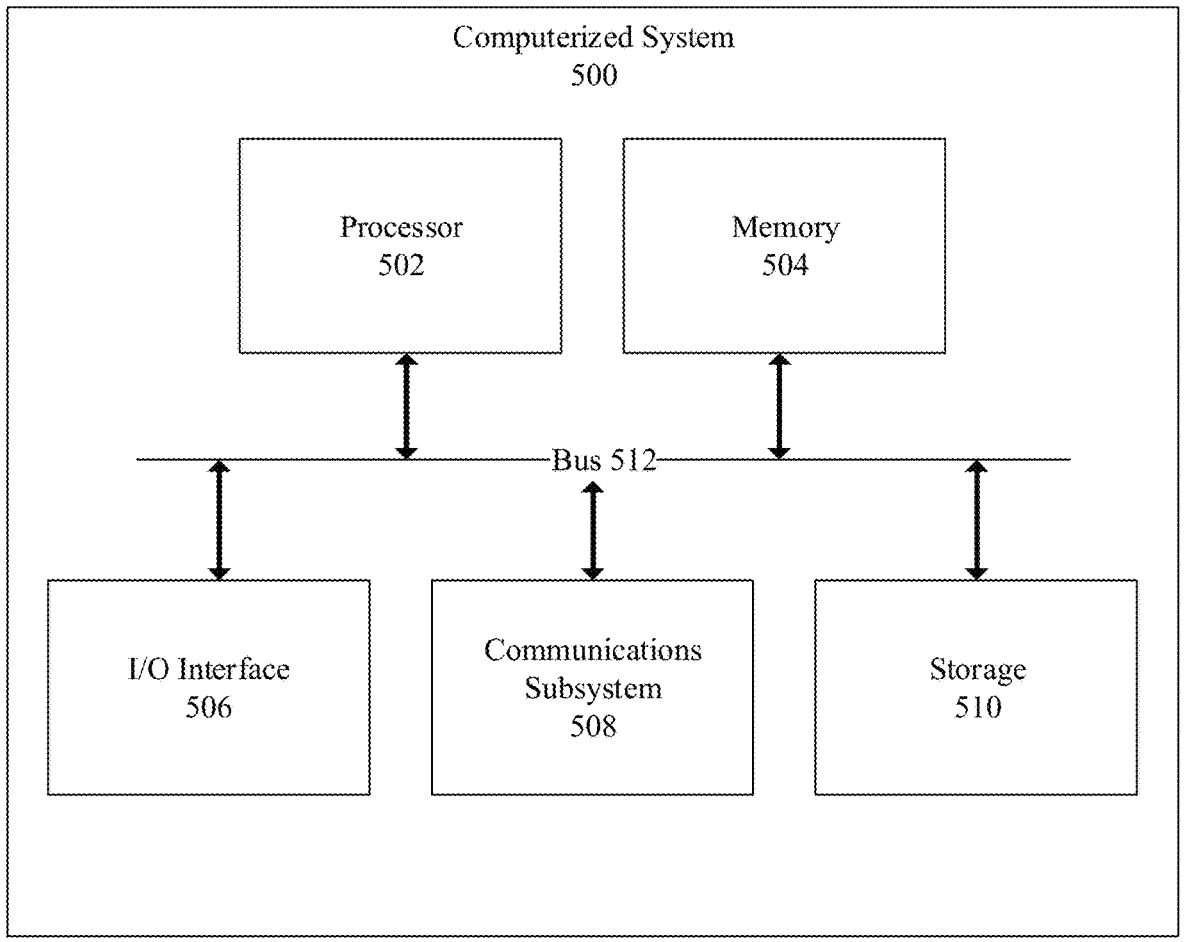
FIG. 5 illustrates an example computing device or system for implementing a system or method for providing feedback to a user of a reported electronic communication, in accordance with an embodiment of the present disclosure.

FIG. 5 is a block diagram of an example computerized device or system 500 that may be used in implementing one or more aspects or components of an embodiment of providing user feedback in accordance with the present disclosure; for example, implementing one or more elements, or sub-components, as described in relation to the system 100, such as modules 108, 110, 112, 114, 116, 118, 120, 122, 124, and/or 126 and/or other modules; and/or, for example, for use in implementing one or more operations of the method 200.

Computerized system 500 may include one or more of a processor 502, memory 504, a mass storage device 510, an input/output (I/O) interface 506, and a communications subsystem 508. Further, system 500 may comprise multiples, for example multiple processors 502, and/or multiple memories 504, etc. Processor 502 may comprise one or more of a digital processor, an analog processor, a digital circuit designed to process information, an analog circuit designed to process information, a state machine, and/or other mechanisms for electronically processing information. These processing units may be physically located within the same device, or the processor 502 may represent processing functionality of a plurality of devices operating in coordination. The processor 502 may be configured to execute modules by software; hardware; firmware; some combination of software, hardware, and/or firmware; and/or other mechanisms for configuring processing capabilities on the processor 502, or to otherwise perform the functionality attributed to the module and may include one or more physical processors during execution of processor readable instructions, the processor readable instructions, circuitry, hardware, storage media, or any other components.

One or more of the components or subsystems of computerized system 500 may be interconnected by way of one or more buses 512 or in any other suitable manner.

The bus 512 may be one or more of any type of several bus architectures including a memory bus, storage bus, memory controller bus, peripheral bus, or the like. The CPU 502 may comprise any type of electronic data processor. The memory 504 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 510 may comprise any type of storage device configured to store data, programs, and other information and to make the data, programs, and other information accessible via the bus 512. The mass storage device 510 may comprise one or more of a solid state drive, hard disk drive, a magnetic disk drive, an optical disk drive, or the like. In some embodiments, data, programs, or other information may be stored remotely, for example in the cloud. Computerized system 500 may send or receive information to the remote storage in any suitable way, including via communications subsystem 508 over a network or other data communication medium.

The I/O interface 506 may provide interfaces for enabling wired and/or wireless communications between computerized system 500 and one or more other devices or systems. For instance, I/O interface 506 may be used to communicatively couple with sensors, such as cameras or video cameras. Furthermore, additional or fewer interfaces may be utilized. For example, one or more serial interfaces such as Universal Serial Bus (USB) (not shown) may be provided.

Computerized system 500 may be used to configure, operate, control, monitor, sense, and/or adjust devices, systems, and/or methods according to the present disclosure.

A communications subsystem 508 may be provided for one or both of transmitting and receiving signals over any form or medium of digital data communication, including a communication network. Examples of communication networks include a local area network (LAN), a wide area network (WAN), an inter-network such as the Internet, and peer-to-peer networks such as ad hoc peer-to-peer networks. Communications subsystem 508 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1394), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, and dedicated short range communication (DSRC). Communication sub system 508 may include one or more ports or other components (not shown) for one or more wired connections. Additionally or alternatively, communication subsystem 508 may include one or more transmitters, receivers, and/or antenna elements (none of which are shown).

Computerized system 500 of FIG. 5 is merely an example and is not meant to be limiting. Various embodiments may utilize some or all of the components shown or described. Some embodiments may use other components not shown or described but known to persons skilled in the art.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A computer implemented method for providing feedback to a user, comprising:
   configuring, via a processor, a plurality of rules, each rule associated with:
     an indicator of suspicious activity, and
     a feedback snippet corresponding to the indicator;
   receiving, at the processor, a report of an electronic communication that is potentially malicious;
   providing, to the user, a survey for soliciting user feedback on the electronic communication, the survey comprising a close ended question prompting the user to identify whether they interacted with the electronic communication;
   receiving, from the user, a user response to the survey;
   evaluating, at the processor, the plurality of rules in an ordered sequence, the plurality of rules including a first rule and subsequent rules;
   triggering, at the processor, the first rule based on the associated indicator and the report of the electronic communication and based on the user response to the survey,
   preventing triggering of the subsequent rules at the processor, in response to triggering the first rule, when triggering the subsequent rules would act in contradiction to the triggered first rule;
   generating, at the processor, feedback comprising the feedback snippet associated with the triggered first rule, and
   automatically providing the feedback to the user in an electronic format.

2. The method according to claim 1, wherein the survey comprises a close ended question prompting the user to select a reason for reporting the electronic communication.

3. The method according to claim 1, further comprising:
   receiving, from the user, a feedback rating selected by the user in response to the feedback provided to the user.

4. The method according to claim 1, further comprising:
   configuring, at the processor, a report function for incorporation into an application for sending and receiving the electronic communication;
   wherein, the processor receives the report of the electronic communication in response to the user engaging the report function.

5. The method according to claim 1, wherein the report of the electronic communication comprises the electronic communication.

6. The method according to claim 1, further comprising:
   generating an initial threat level based on assessing the electronic communication against common indicators of a malicious electronic communication.

7. The method according to claim 6, wherein each of the plurality of rules are further associated with a threat level corresponding to the indicator, the method further comprising:
   generating a final threat level based on the initial threat level and the threat level for the each triggered rule,
   wherein the feedback further comprises the final threat level.

8. The method according to claim 1, wherein the feedback snippet comprises information for educating the user on a risk associated with the indicator.

9. The method according to claim 1, wherein the feedback snippet comprises information for educating the user on a preferred behaviour for avoiding a risk associated with the indicator.

10. The method according to claim 1, wherein the feedback comprises providing the feedback snippets of the each triggered rule in a single digest.

11. The method according to claim 10, wherein the plurality of rules are configured in an ordered sequence.

12. The method according to claim 11, wherein generating the feedback further comprises presenting the feedback snippets in an order corresponding to the ordered sequence of the plurality of rules.

13. The method according to claim 1, wherein the plurality of rules comprise a rule wherein the associated indication of suspicious activity is a malicious link.

14. The method according to claim 1, wherein the report of the suspicious electronic communication does not trigger any of the plurality of rules and the feedback comprises a snippet advising of a likely safe electronic communication.

15. The method according to claim 1, wherein providing the feedback comprises delivering the feedback in an e-mail to an e-mail account associated with the user.

16. The method according to claim 1, wherein providing the feedback comprises at least one of: delivering the feedback in an e-mail to an e-mail account associated with the user, delivering the feedback in a text message to a phone number associated with the user, delivering the feedback to an instant messaging application accessible by the user, or delivering the feedback in an electronic format to a platform accessible by the user.

17. A computing platform configured for providing feedback to a user, the computing platform comprising:
   a non-transient computer-readable storage medium having executable instructions embodied thereon; and
   one or more hardware processors configured to execute the instructions to:
     configure, via a processor, a plurality of rules, each rule associated with:
       an indicator of suspicious activity, and
       a feedback snippet corresponding to the indicator;
     receive, at the processor, a report of an electronic communication that is potentially malicious;
     provide, to the user, a survey for soliciting user feedback on the electronic communication, the survey comprising a close ended question prompting the user to identify whether they interacted with the electronic communication;
receive, from the user, a user response to the survey;
evaluate, at the processor, the plurality of rules in an ordered sequence, the plurality of rules including a first rule and subsequent rules;
trigger, at the processor, the first rule based on the associated indicator and the report of the electronic communication and based on the user response to the survey,
prevent triggering of the subsequent rules at the processor, in response to triggering the first rule, when triggering the subsequent rules would act in contradiction to the triggered first rule;
generate, at the processor, feedback comprising the feedback snippet associated with the triggered first rule, and
automatically provide the feedback to the user in an electronic format.

18. A non-transient computer-readable storage medium having instructions embodied thereon, the instructions being executable by one or more processors to perform a method for providing feedback to a user, the method comprising:
configuring, via a processor, a plurality of rules, each rule associated with:
an indicator of suspicious activity, and
a feedback snippet corresponding to the indicator;
receiving, at the processor, a report of an electronic communication that is potentially malicious;
providing, to the user, a survey for soliciting user feedback on the electronic communication, the survey comprising a close ended question prompting the user to identify whether they interacted with the electronic communication;
receiving, from the user, a user response to the survey;
evaluating, at the processor, the plurality of rules in an ordered sequence, the plurality of rules including a first rule and subsequent rules;
triggering, at the processor, the first rule based on the associated indicator and the report of the electronic communication and based on the user response to the survey,
preventing triggering of the subsequent rules at the processor, in response to triggering the first rule, when triggering the subsequent rules would act in contradiction to the triggered first rule;
generating, at the processor, feedback comprising the feedback snippet associated with the triggered first rule, and
automatically providing the feedback to the user in an electronic format.

\* \* \* \* \*